United States Patent [19]

Wiebe

[11] 4,317,513

[45] Mar. 2, 1982

[54] CENTRIFUGAL CLUTCH

[75] Inventor: Koning Wiebe, Zwolle, Netherlands

[73] Assignee: Machinefabriek en Technische Handelsonderneming M. H. Van Der Graaf BV, Vollenhove, Netherlands

[21] Appl. No.: 106,528

[22] Filed: Dec. 26, 1979

[30] Foreign Application Priority Data

Dec. 28, 1978 [NL] Netherlands .......................... 7812622

[51] Int. Cl.³ ..................... F16D 43/284; F16D 35/00
[52] U.S. Cl. ............................. 192/105 A; 192/58 A
[58] Field of Search ............... 192/105 A, 58 A, 58 B, 192/58 R

[56] References Cited

U.S. PATENT DOCUMENTS

| 2,706,547 | 4/1955 | Ranzi | 192/58 A |
| 2,771,170 | 11/1956 | Badin | 192/105 A |
| 2,813,606 | 11/1957 | Badin | 192/58 A |
| 2,854,860 | 10/1958 | Ranzi | 192/58 A |
| 3,257,808 | 6/1966 | Kuiper | 192/58 A |

*Primary Examiner*—George H. Krizmanich
*Attorney, Agent, or Firm*—Daley & Brandt

[57] ABSTRACT

A centrifugal clutch, in particular a centrifugal powder clutch, comprising a housing and a rotor mounted for rotation in said housing. The rotor has at least one circumferential groove, each wall of which is provided with a passage that is at an angle different from 90° to the median plane of the rotor, thereby to promote circulation of the powder when the clutch slips.

10 Claims, 5 Drawing Figures a  b  c  d

CENTRIFUGAL CLUTCH

This invention relates to a centrifugal clutch, in particular one of the kind disclosed in U.S. Pat. No. 2,854,860, which is known by the name of centrifugal powder clutch.

A clutch of this kind comprises a housing and a rotor mounted for rotation in said housing, said rotor having at least one channel-shaped circumferential groove, each wall of which has at least one passage. In the clutch described in U.S. Pat. No. 2,854,860, when the clutch is in engagement with slippage, the powder is brought into circulation by fins provided on the inner wall of the housing, which force the powder outwardly, whereafter the powder flows into the circumferential groove and, through the passage provided in the bottom of the groove, flows outwardly.

In such a clutch, the greatest heat generation occurs outwardly of the walls of the channel-shaped groove. In the construction described in the above U.S. patent, the powder will flow from the place of greatest heat generation first through the rotor before flowing along the finned wall of the housing where dissipation of heat is possible. As a consequence the period of slippage of this clutch, or its service life is greatly limited.

It is an object of the present invention to overcome the above disadvantage.

For this purpose, the centrifugal clutch according to the invention is characterized in that each passage is arranged at an angle to the median plane of the rotor different from 90°. As a consequence, when the clutch is in a slipping state, a powder circulation will occur that is opposite to that in the device described in U.S. Pat. No. 2,854,860, i.e., in the clutch according to the present invention the powder flows from the point of greatest heat generation, i.e. radially outwards of the walls of the circumferential groove, along the cooling outer walls of the housing in the direction of the axis of rotation of the rotor and thence through the passages in the walls of the groove and subsequently radially outwardly. As a consequence, heat dissipation is very substantially improved, by virtue of which relatively long slip periods are permissible.

In order to improve the circulation of powder still further, each passage is preferably equipped with a blade projecting from the circumferential groove of the rotor.

In order that, unlike the clutch described in U.S. Pat. No. 2,854,860, the centrifugal clutch according to the present invention may be used for two directions of rotation, the or each passage in the circumferential groove wall is preferably provided with at least two oppositely directed blades. Desirable, the part directed to the groove extends into the groove. This feature will prevent the material flowing through one of the two passages in the groove wall thus formed from flowing immediately outwards through the other passages.

In one embodiment of the invention, the blades are formed from parts bent out of the groove wall.

In order to ensure that a sufficient amount of powder is supplied to the groove, the width of the passage is preferably equal or substantially equal throughout the entire height of the blade.

In order to produce the desired ratio between the starting torque and the pull-out torque, i.e. the moment of overload when the clutch will slip, the groove may take different forms, for example, V-shaped, U-shaped, a combination of these, or like configurations. It is also possible for the walls of the groove to be formed asymmetrically relatively to the median plane of the rotor.

In order to optimize cooling of the powder during its movement along the wall of the housing, the latter being provided in known manner with cooling fins, in a preferred embodiment of the present invention there are further provided annular guides fixedly connected to the housing. In order to promote thorough mixing of the powder, the guides are preferably each connected to the housing by means of a plurality of off-set ribs.

The mixing of the powder can be improved still further by providing the inner wall of the housing with studs or like projections.

In addition to those recited, the centrifugal clutch according to the present invention has the advantage that, with the same diameter as the prior clutch, the starting torque to be transmitted is considerably higher as a consequence of the increase in pressure on the powder in the zone at the outer circumference of the powder forced into the rotor groove, which is subject to a counter-pressure from the powder which seeks to move outwardly through centrifugal force on opposite sides of the rotor. For in the prior clutches the pressure on the powder in this area is no greater than that to which the powder is subject from the centrifugal force exercised on the powder present on opposite sides of the rotor.

One embodiment of the centrifugal clutch according to the present invention will now be described with reference to the accompanying drawings. In said drawings.

Figure 1:
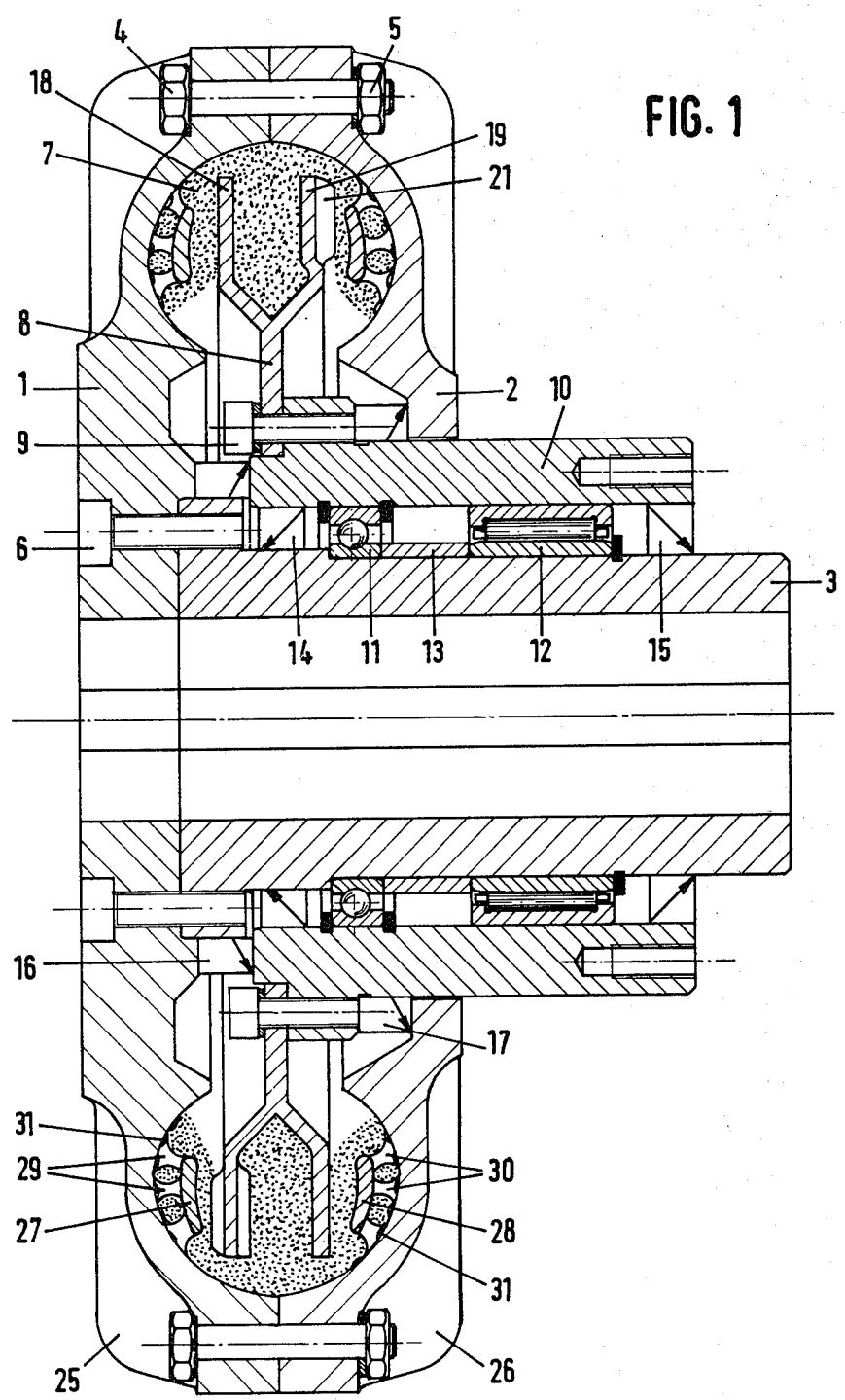
FIG. 1 is a cross-sectional view of a centrifugal clutch according to the invention, with the rotor being shown in section taken on the line I—I of FIG. 2.

Referring to the drawings, the centrifugal powder clutch shown comprises a housing which consists of two sections 1 and 2 and a hub section 3, which housing can be connected to a driving shaft not shown. Sections 1 and 2 of the housing are interconnected by bolts 4 and nuts 5, uniformly spaced about their circumferences, sections 1 and 3 being interconnected by bolts 6.

Housing 1, 2 comprises a chamber 7 largely circular in cross-section. This chamber contains a rotor 8, secured by means of bolts 9, uniformly spaced about its circumference, to a driven output bushing 10.

Provided between bushing 10 and hub section 3 is a ball bearing 11 and a needle bearing 12, separated from each other by a spacer sleeve 13. Outwardly of the bearings there are provided sealing rings or retaining rings 14 and 15.

In order to ensure that the powder contained in the clutch, i.e. the chamber, the place of which during slippage is shown dotted in FIG. 1, does not find its way in between vital parts or is accidentally removed from the clutch, there are further provided sealing rings 16 and 17.

Figure 2:
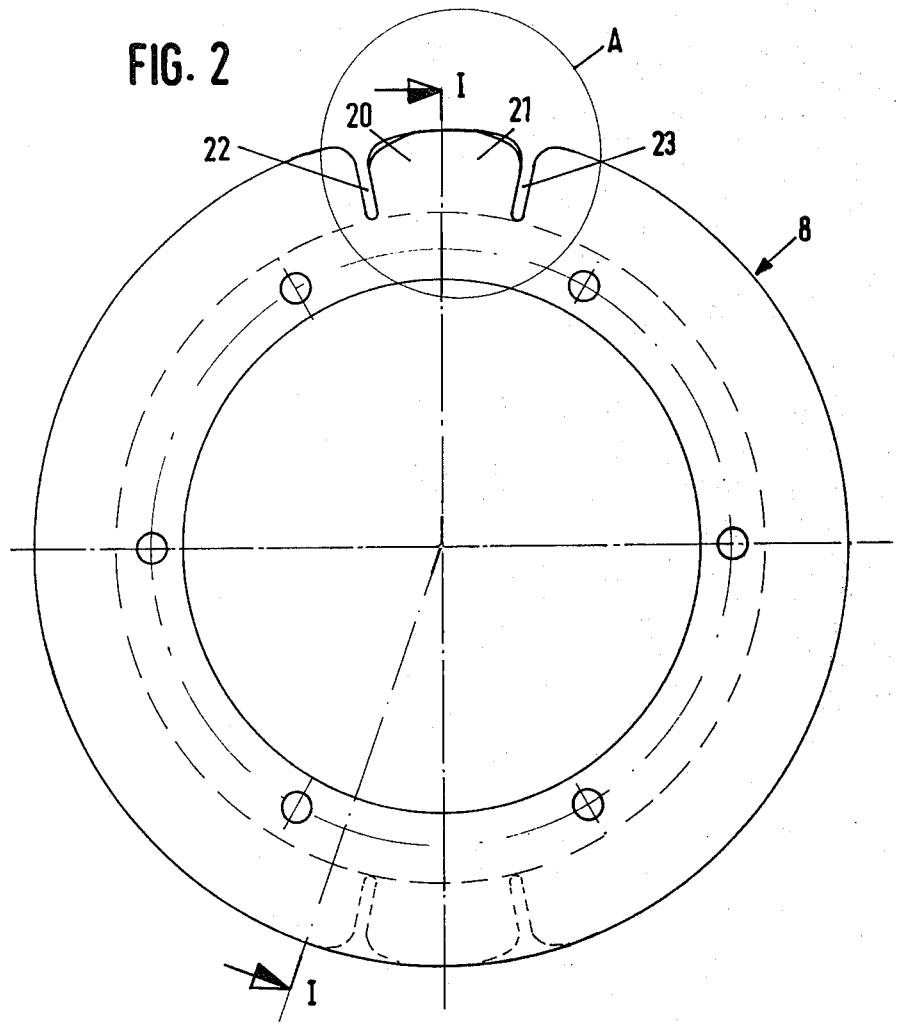
FIG. 2 is a side-elevational view of the rotor used in the clutch shown in FIG. 1.
Figure 3:
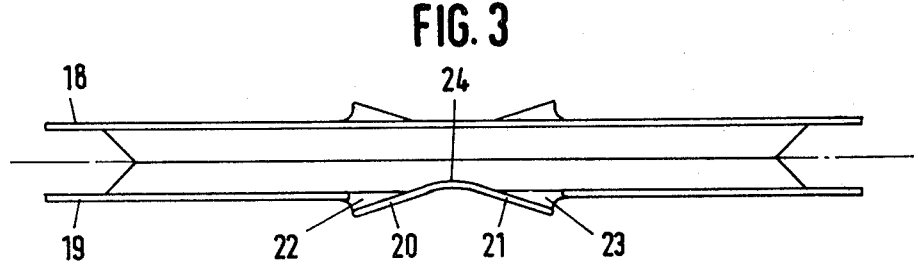
FIG. 3 is a bottom view of the rotor shown in FIG. 2.
Figure 4:
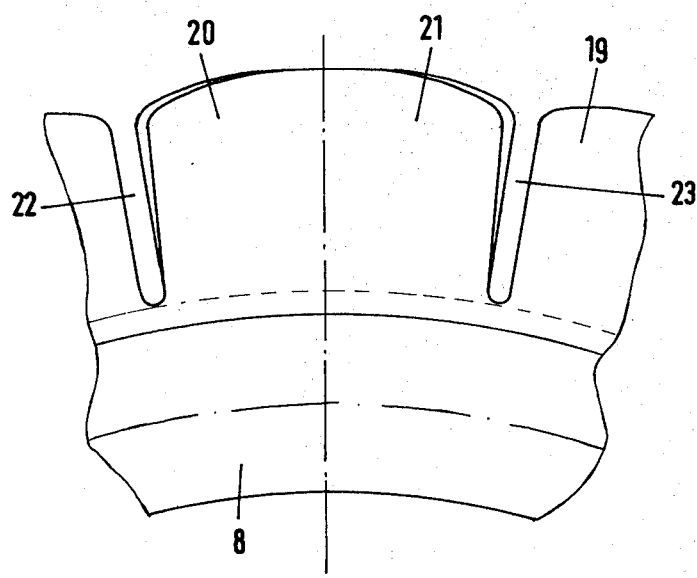
FIG. 4 is an enlarged view of a detail A of the rotor illustrated in FIG. 2.

As shown in FIGS. 1, 2 and 3, rotor 8 is provided with a channel-shaped, in this case a U-shaped circumferential groove having walls or legs 18 and 19. The walls of the groove are provided at diametrically opposed points with passages 22, 23, each provided with blades 20 and 21, respectively. In the embodiment shown, the blades and passages are formed by outwardly bent parts of walls 18 and 19. Passages 22,23 it will be noted and as best seen in FIG. 3, are arranged at an angle to the median plane of the rotor different from 90° i.e., at an angle acute with the rotor median plane. It also will be noted that entry to the said passages is obliquely oriented relative to such plane.

At the point designated by 24, the part of the blades directed towards the groove extends into the groove of the rotor (FIG. 3).

In operation, the powder will move outwardly through the centrifugal force. When the clutch slips, powder will be "forced" into the rotor groove by means of the blades, as a result of which the pressure in the powder in the portion between the rotor groove and the inner circumference of the housing will be increased. In order that the pressure may be sufficiently high, i.e. in order that there may be a sufficient "supply" of powder, the width of the passages throughout the entire height of the blades is preferably equal and sufficiently large; when the passage is too small and hence insufficient powder is supplied, the pressure in the chamber is decreased, whereas an unduly large passage or a blade bent outwardly too far has the effect of increasing the pull-out torque. A portion of the powder will not flow against the centrifugal force along the inner wall of the housing radially inwardly and subsequently be again collected by the blades and again brought under pressure.

In order to cool the thus moving powder, sections 1 and 2 of the housing are provided with fins 25 and 26, respectively. To ensure that the powder flows along the "cooling" inner wall in as favourable a fashion as possible, annular guides 27 and 28 are provided in the housing.

These guides are each connected to the housing section 1, 2 concerned by means of a plurality of ribs 29 and 30, provided in off-set interrelationship, that is to say, placed at different radial distances in order to bring about as great a turbulence as possible in the powder to be cooled. This turbulence is increased still further by the provision of studs 31 on the inner wall of housing sections 1 and 2 adjacent chamber 7.

The clutch described has the advantage that when slipping the material is sufficiently brought into circulation, i.e. cooled in order to make possible longer periods of slippage as compared with prior clutches.

In addition, the ratio between starting torque and pull-out torque can be varied by changing the height and the degree of bending of the blades.

Figure 5:
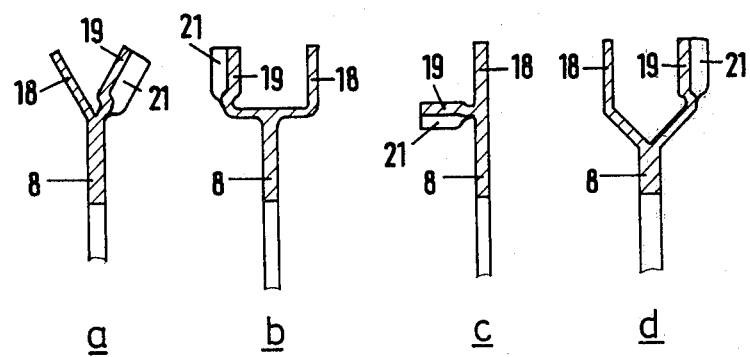
FIG. 5 shows a number of variants of the rotor shown in FIGS. 1-4.

Other ratios between starting and pull-out torques can be obtained by modifying the shape and the depth of the rotor groove. Examples are indicated in FIG. 5, in which identical parts are designated by the same reference numerals.

It is further noted that in the embodiment shown in FIGS. 1–4, each leg of the groove is provided with two oppositely directed blades, each destined for one direction of rotation. In order to ensure that, in the embodiment shown, the material flowing into the groove does not flow outwards again through the next passage, the portion of the blades directed to the groove extends inwardly up to the place of the groove (point 24). It will be clear that more blades may be provided, uniformly spaced about the circumference, so as to minimize adverse effects on the material flowing through each of the passages.

It is observed that a large number of variations and modifications can be made without departing from the scope of the present invention.

What I claim is:

1. A centrifugal powder clutch comprising
 a housing fixedly connected to a driving shaft,
 a rotor, mounted for rotation in said housing and fixedly connected to a shaft to be driven,
 said rotor having an open channel-shaped circumferential groove confined between two ring-shaped walls of the rotor, said walls being situated on opposite sides of the median rotor plane,
 each wall being provided with at least one passage, each passage being arranged at an acute angle with the rotor median plane,
 the entrance of each passage being obliquely oriented relative to such plane.

2. A centrifugal clutch as claimed in claim 1, wherein each passage is equipped with a blade projecting from the circumferential groove of the rotor.

3. A centrifugal clutch, in particular a centrifugal powder clutch, which comprises a housing and a rotor mounted for rotation in said housing, said rotor having at least one channel-shaped circumferential groove confined between two-ringshaped rotor walls, each wall of which has at least one passage, characterized in that each passage is arranged at an angle to the median plane of the rotor different from 90, each passage being equipped with a blade projecting from the circumferential groove of the rotor and characterized further in that the or each passage in the circumferential groove wall is provided with at least two oppositely directed blades.

4. A centrifugal clutch as claimed in claim 3, wherein the part of said two oppositely directed blades that is directed to the groove extends into the groove.

5. A centrifugal clutch as claimed in claim 3 or 4, wherein the blades are formed from parts bent out of the groove wall.

6. A centrifugal clutch as claimed in claim 5, wherein the width of the passage is the same or substantially the same throughout the entire height of the blade.

7. A centrifugal clutch as claimed in claim 3 wherein the walls of the groove are formed asymmetrically relatively to the median plane of the rotor.

8. A centrifugal clutch as claimed in claim 3 and further comprising annular guides fixedly connected to the housing on opposite sides of the rotor.

9. A centrifugal clutch as claimed in claim 8, wherein the guides are each connected to the housing by means of a plurality of off-set ribs.

10. A centrifugal clutch as claimed in claim 3 wherein the inner wall of the housing is provided with studs or like projections.

* * * * *